(12) United States Patent
Bingham et al.

(10) Patent No.: US 8,444,846 B2
(45) Date of Patent: May 21, 2013

(54) METHOD AND SYSTEM FOR PRODUCING HYDROGEN USING SODIUM ION SEPARATION MEMBRANES

(75) Inventors: Dennis N. Bingham, Idaho Falls, ID (US); Kerry M. Klingler, Idaho Falls, ID (US); Terry D. Turner, Idaho Falls, ID (US); Bruce M. Wilding, Idaho Falls, ID (US); Lyman Frost, Midway, UT (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 541 days.

(21) Appl. No.: 12/632,058

(22) Filed: Dec. 7, 2009

(65) Prior Publication Data

US 2011/0135565 A1    Jun. 9, 2011

(51) Int. Cl.
*C25C 1/02* (2006.01)
*C01B 3/08* (2006.01)

(52) U.S. Cl.
USPC .............................. 205/560; 204/263; 423/657

(58) Field of Classification Search
None
See application file for complete search history.

(56) References Cited

U.S. PATENT DOCUMENTS

| | | | |
|---|---|---|---|
| 2,660,517 A | 11/1953 | Padgitt | |
| 3,490,871 A * | 1/1970 | Miller et al. | 423/657 |
| 3,740,193 A | 6/1973 | Aldridge et al. | |
| 3,796,647 A | 3/1974 | Shalit | |
| 4,356,163 A | 10/1982 | Davidson | |
| 5,286,473 A * | 2/1994 | Hasebe et al. | 423/657 |
| 5,290,405 A | 3/1994 | Joshi et al. | |
| 5,580,430 A | 12/1996 | Balagopal et al. | |
| 5,593,552 A | 1/1997 | Joshi et al. | |
| 6,787,019 B2 * | 9/2004 | Jacobson et al. | 205/406 |
| 6,997,012 B2 | 2/2006 | Zollinger et al. | |
| 7,078,012 B2 | 7/2006 | Bingham et al. | |
| 7,097,675 B2 | 8/2006 | Detering et al. | |
| 7,153,489 B2 | 12/2006 | Bingham et al. | |
| 7,294,323 B2 | 11/2007 | Klingler et al. | |
| 2002/0166286 A1 | 11/2002 | McClaine et al. | |
| 2004/0011662 A1 | 1/2004 | Xu et al. | |
| 2006/0144701 A1 | 7/2006 | Kelly | |
| 2006/0169594 A1 | 8/2006 | Balagopal et al. | |
| 2007/0045125 A1 | 3/2007 | Hartvigsen et al. | |
| 2008/0173540 A1 | 7/2008 | Joshi et al. | |
| 2008/0173551 A1 | 7/2008 | Joshi et al. | |
| 2008/0241613 A1 | 10/2008 | Kelly et al. | |
| 2008/0271377 A1 | 11/2008 | Zhou | |
| 2008/0318097 A1 | 12/2008 | Botte | |
| 2009/0053133 A1 | 2/2009 | Zaluska et al. | |
| 2009/0090638 A1 | 4/2009 | Kelly et al. | |

OTHER PUBLICATIONS

PCT International Search Report and Written Opinion of the International Searching Authority for PCT/US10/56243, dated Jan. 13, 2011, 15 pages.

* cited by examiner

*Primary Examiner* — Harry D Wilkins, III
(74) *Attorney, Agent, or Firm* — TraskBritt

(57) ABSTRACT

A method of producing hydrogen from sodium hydroxide and water is disclosed. The method comprises separating sodium from a first aqueous sodium hydroxide stream in a sodium ion separator, feeding the sodium produced in the sodium ion separator to a sodium reactor, reacting the sodium in the sodium reactor with water, and producing a second aqueous sodium hydroxide stream and hydrogen. The method may also comprise reusing the second aqueous sodium hydroxide stream by combining the second aqueous sodium hydroxide stream with the first aqueous sodium hydroxide stream. A system of producing hydrogen is also disclosed.

17 Claims, 3 Drawing Sheets

METHOD AND SYSTEM FOR PRODUCING HYDROGEN USING SODIUM ION SEPARATION MEMBRANES

GOVERNMENT RIGHTS

This invention was made under a Cooperative Research and Development Agreement between Alberta Limited and Battelle Energy Alliance, LLC under Contract No. DE-AC07-051D14517, awarded by the U.S. Department of Energy. The U.S. Government has certain rights in the invention.

TECHNICAL FIELD

The present invention relates to a method and system of producing hydrogen gas. More specifically, embodiments of the present invention relate to a method and a system of producing hydrogen gas from sodium hydroxide and water using a sodium ion separation membrane.

BACKGROUND

Hydrogen is considered by many to be a promising energy alternative to carbon-based fuels. Hydrogen is particularly attractive as a fuel because of the lack of resultant production of polluting substances such as unburned hydrocarbons including greenhouse gases such as carbon oxides, sulfur oxides, and nitrogen oxides that are typically associated with the combustion of various petroleum based/derived fuels. In addition to energy conveyance, hydrogen gas has numerous industrial uses such as, for example, in the production of electronics, desulphurization of fuels, production of ammonia, and upgrading of petroleum sources.

Various technologies and methods are known for the production of hydrogen. While hydrogen is the most abundant element in the universe, it is rarely found in its natural form, but rather is found in compounds such as: hydrocarbons, carbohydrates, fuels, and water. To separate hydrogen from these compounds as hydrogen fuels is not only complicated and tedious, but is also very expensive. The most common methods of producing hydrogen are: electrolysis, gasification of hydrocarbons, enzymatic activities, reaction of certain metals or metallic compounds with water, and extraction from fossil fuels such as natural gas or methanol. These methods, however, either directly produce pollutants or require large quantities of energy wherein the production of energy produces pollutants.

While the advantages of using a fuel such as hydrogen to replace fossil fuels as a primary energy source are many, no single approach has emerged that will provide a convenient means whereby hydrogen can be economically produced in a form, whether gaseous or liquefied, which makes it useful in the applications noted above.

Accordingly, there exists a need for a method and system of generating hydrogen which are efficient in terms of both energy utilized and reactants consumed. Still further, there exists a need for such a method and composition that are environmentally benign and do not produce undesirable waste or byproducts.

BRIEF SUMMARY OF THE INVENTION

The present invention relates to a method of producing hydrogen from sodium hydroxide and water. The method comprises separating sodium from a first aqueous sodium hydroxide stream in a sodium ion separator, feeding the sodium produced in the sodium ion separator to a sodium reactor, reacting the sodium in the sodium reactor with water, and producing a second aqueous sodium hydroxide stream and hydrogen. In some embodiments, the method further includes reusing the second aqueous sodium hydroxide stream by combining the second aqueous sodium hydroxide stream with the first aqueous sodium hydroxide stream. In such embodiments, water, hydrogen, and oxygen are the only products produced by the present invention.

In further embodiments of the present invention, separating sodium from the first aqueous sodium hydroxide stream in the sodium ion separator comprises feeding the first sodium hydroxide stream into an anolyte compartment of an electrolytic cell, feeding mineral oil into a catholyte compartment of an electrolytic cell, and applying a potential across the cell. The anolyte compartment and the catholyte compartment of the cell are separated by a ceramic membrane that, upon application of the electric potential across the cell, selectively transports sodium cations from the anolyte compartment to the catholyte compartment. The sodium cations, following their transport across the membrane, combine with an electron forming elemental sodium. The mineral oil in the catholyte compartment protects the elemental sodium from reacting with air and/or moisture.

In association with the methods of this invention, a system of producing hydrogen from sodium hydroxide and water is also provided. The system includes a sodium ion separator configured for separating sodium from a first sodium hydroxide stream and a reactor configured for reacting sodium with water to produce a second sodium hydroxide stream and hydrogen. In further embodiments, the system comprises an electrolytic cell for separating the sodium from the first sodium hydroxide stream. The cell comprises a catholyte compartment containing a cathode and mineral oil, an anolyte compartment containing an anode and sodium hydroxide, and a sodium-selective ceramic membrane separating the anolyte compartment and the catholyte compartment that selectively permits the flow of sodium cations from the anolyte compartment to the catholyte compartment upon application of a voltage across the cell.

These and other aspects of the present invention will be discussed in greater detail hereinafter.

BRIEF DESCRIPTION OF THE DRAWINGS

While the specification concludes with claims particularly pointing out and distinctly claiming that which is regarded as the present invention, advantages of this invention may be more readily ascertained from the following detailed description when read in conjunction with the accompanying drawings in which:

DETAILED DESCRIPTION

Figure 1:
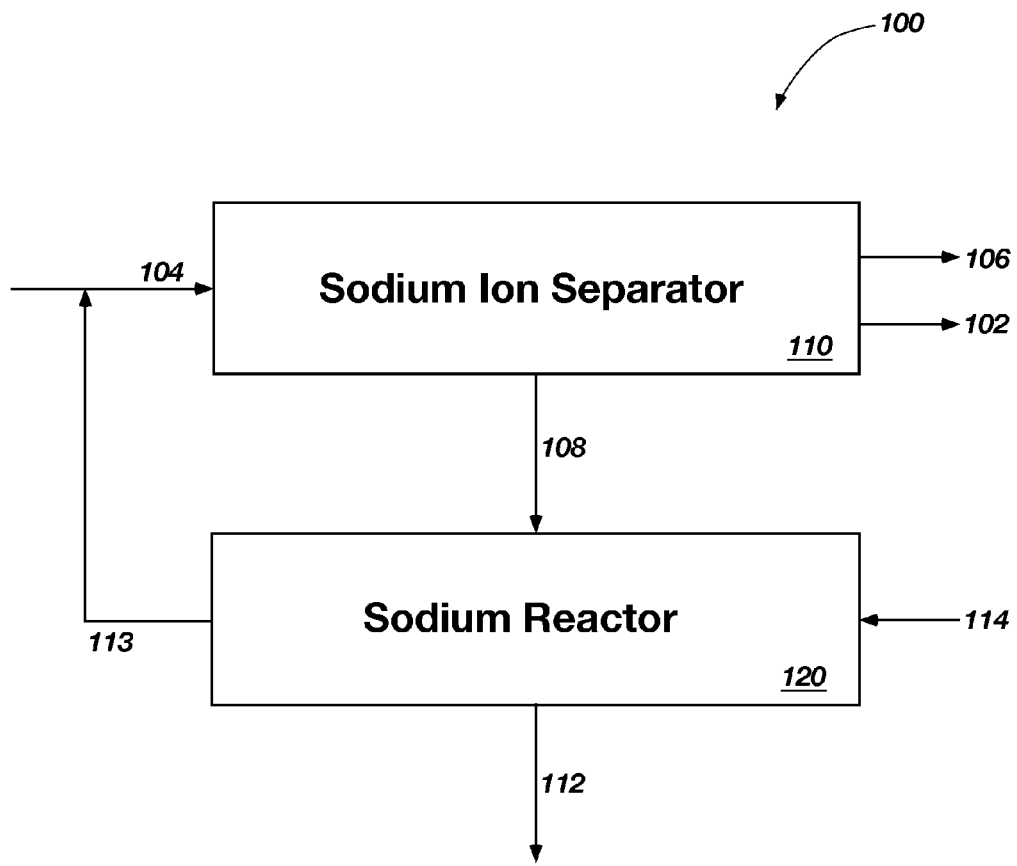
FIGS. 1 and 2 are simplified schematics of a system for producing hydrogen from sodium hydroxide and water according to particular embodiments of the invention.
Figure 2:
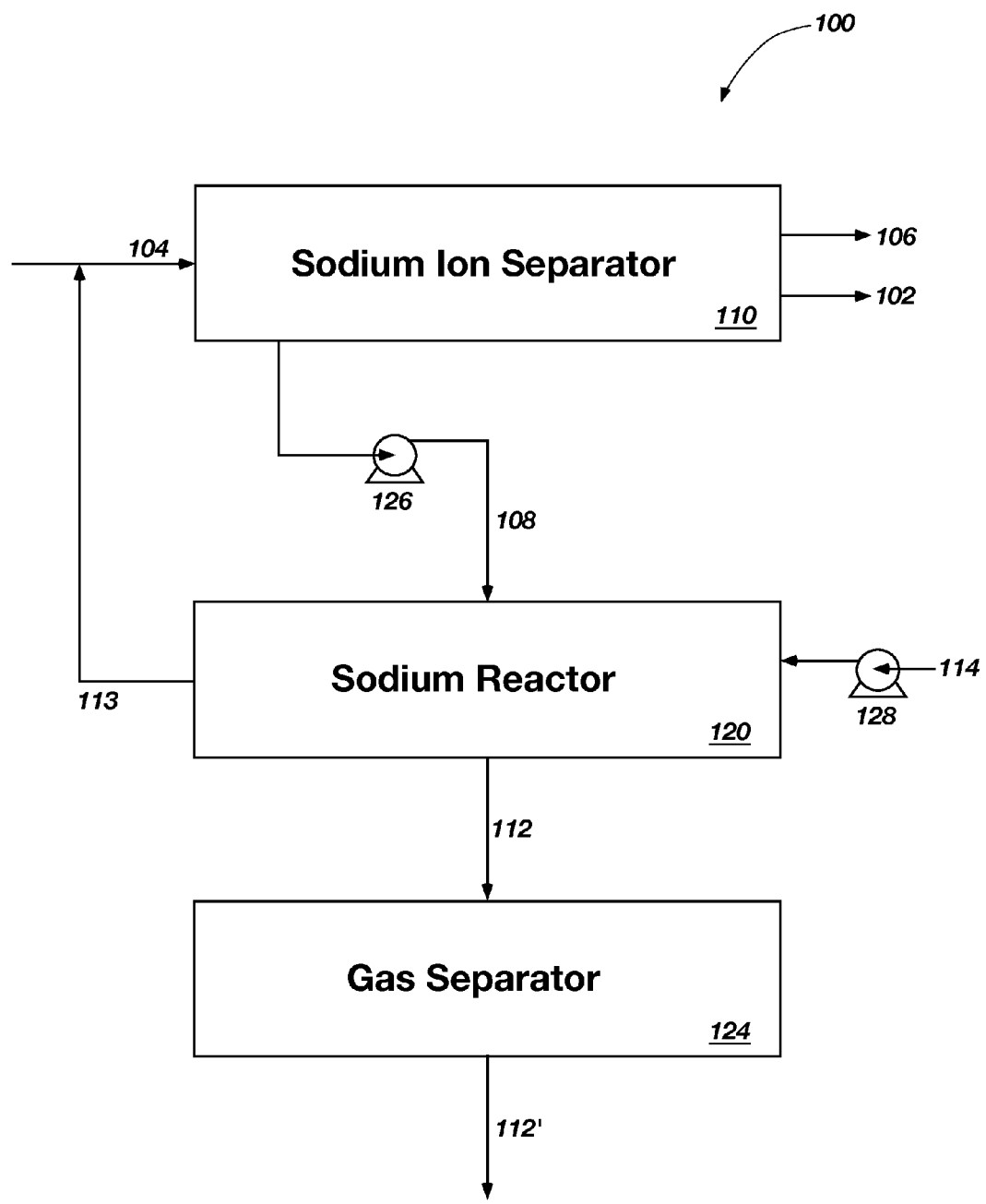

An embodiment of a hydrogen generation system 100 of the present invention is shown in the simplified schematic diagram illustrated in FIG. 1. The hydrogen generation system 100 includes a sodium ion separator 110 and a sodium reactor 120. Optionally, as shown in FIG. 2, the hydrogen generation system 100 may also include pumps 126, 128, and a gas separator 124.

One embodiment of a method of the present invention includes feeding a first aqueous sodium hydroxide stream 104 into the sodium ion separator 110 producing sodium 108, water 102, and oxygen 106. The sodium 108 is fed into the sodium reactor 120 where the sodium 108 reacts with water 114 generating hydrogen 112 and a second aqueous sodium hydroxide stream 113. In some embodiments, the second aqueous sodium hydroxide stream 113 may be recycled by combining the second aqueous sodium hydroxide stream 113 with the first aqueous sodium hydroxide stream 104. As illustrated in FIG. 2, pump 126 may be used to pressurize the sodium 108 before feeding the sodium 108 to the sodium reactor 120. Similarly, pump 128 may be used to pressurize the water 114 before feeding the water 114 to the sodium reactor 120. Furthermore, the hydrogen 112 produced in the sodium reactor 120 may be fed to a gas separator 124 to produce a purified hydrogen 112'.

Figure 3:
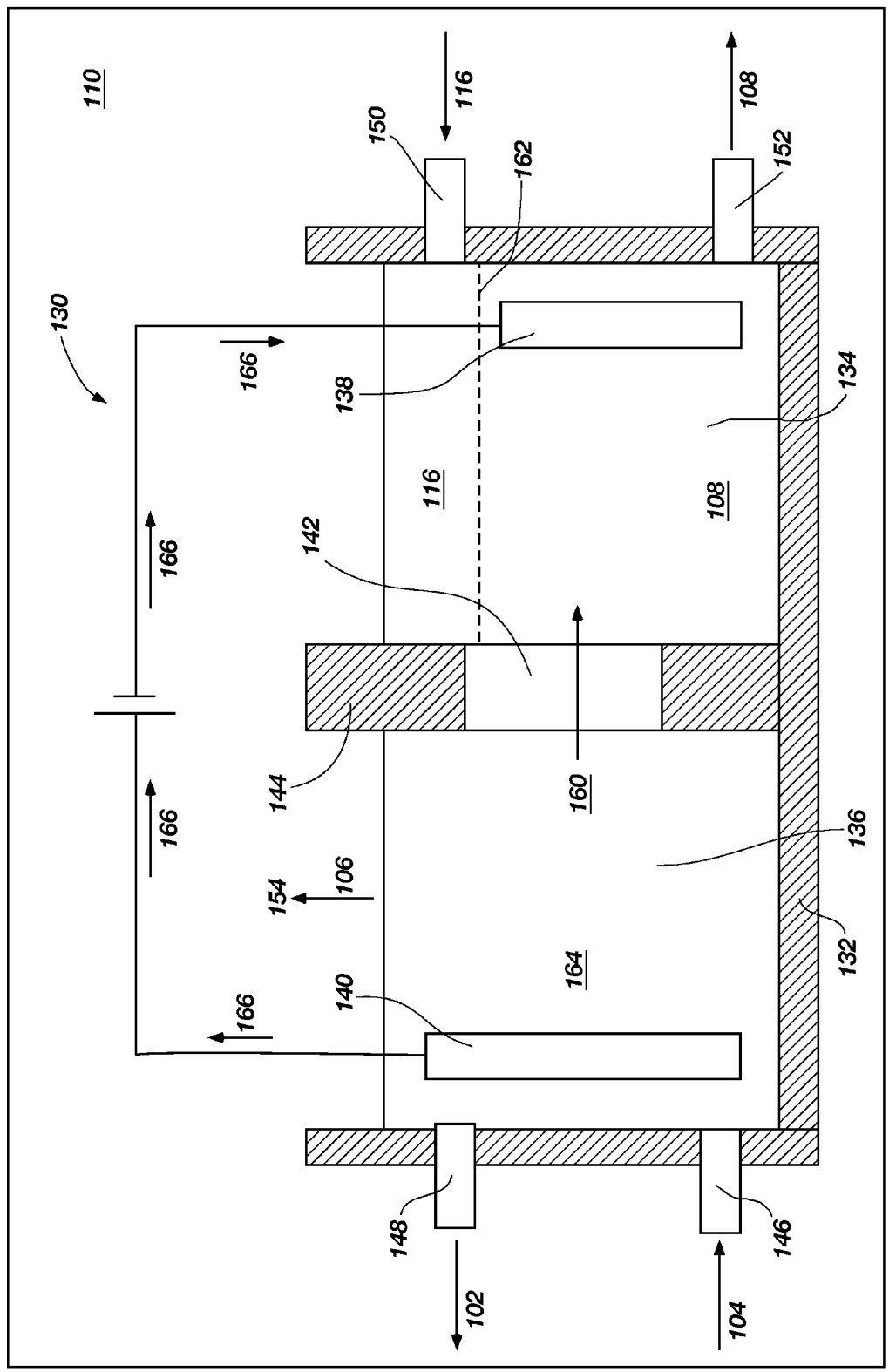
FIG. 3 is a schematic representation of an electrolytic cell according to one embodiment of the invention.

The sodium ion separator 110 of the hydrogen generation system 100 may comprise, for example, an electrolytic cell. One example of an electrolytic cell is described in U.S. Patent Application Publication No. 2006/0169594 to Balagopal et. al. entitled *Electrolytic Method to Make Alkali Alcoholates Using Ceramic Ion Conducting Solid Membranes*, now U.S. Pat. No. 7,959,784, issued Jun. 14, 2011, the disclosure of which document is incorporated herein in its entirety by this reference. One embodiment of an electrolytic cell of the present invention is illustrated in FIG. 3. The cell 130 comprises a container 132, a catholyte chamber 134, an anolyte chamber 136, a cathode 138, an anode 140, and a ceramic membrane 142 which may be positioned in a scaffold or holder 144. The container 132, and other parts of the cell 130, may be made of any suitable material, including metal, glass, plastics, composite, ceramic, other materials, or combinations of the foregoing. The material that forms any portion of the cell 130 is preferably not reactive with or substantially degraded by the chemicals and conditions that the cell 130 is exposed to as part of the process.

The cell 130 further comprises an anolyte inlet 146, an anolyte outlet 148, a catholyte inlet 150, and a catholyte outlet 152. Venting means 154 are provided to vent, treat and/or collect gases that may be released from the anolyte chamber 136. The venting means 154 may be a simple venting system such as openings, pores, or holes in the upper portion of the container 132, and/or a collection tube, hose, or conduit in fluid communication with an airspace or gap above the fluid level in the anolyte chamber 136.

The membrane 142 in the cell 130 may comprise a material capable of selectively transporting sodium cations from the anolyte chamber 136 to the catholyte chamber 134. For example, the membrane 142 may include a ceramic NaSICON (Sodium Super Ionic Conductor) material. NaSICON membrane compositions and types are known in the art and are described, for example, in U.S. Pat. No. 5,580,430 entitled *Selective Metal Cation-Conducting Ceramics* assigned to Ceramatech, the disclosure of which document is incorporated herein in its entirety by this reference. The NaSICON membrane 142 exhibits a high ion-conductivity for sodium ions at low temperatures and is essentially impermeable to other additional chemical components which may be found in the catholyte chamber 134 and the anolyte chamber 136.

The sodium ion separator 110, such as electrochemical cell 130, of the hydrogen generation system 100 may be configured to receive and separate the first aqueous sodium hydroxide stream 104 into sodium 108, water 102 and oxygen 106. The electrochemical cell 130 separates aqueous sodium hydroxide according to the following reactions:

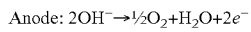

Anode: $2OH^- \rightarrow \frac{1}{2}O_2 + H_2O + 2e^-$  Reaction 1

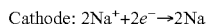

Cathode: $2Na^+ + 2e^- \rightarrow 2Na$  Reaction 2

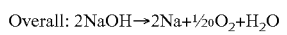

Overall: $2NaOH \rightarrow 2Na + \frac{1}{2}O_2 + H_2O$  Reaction 3

Reactions 1, 2, and 3 are electrolytic reactions taking place under an induced current wherein electrons 166 are introduced or are removed to cause the reactions.

One method of producing sodium 108 from the first aqueous sodium hydroxide stream 104 according to the present invention is by feeding the first aqueous sodium hydroxide stream 104 into the anolyte chamber 136 of the cell 130 through anolyte inlet 146. An electric potential is applied to the cell 130 causing the first aqueous sodium hydroxide stream 104 to decompose into sodium ions 160 and hydroxide ions 164. The sodium ions 160 are transported from the anolyte chamber 136 across the membrane 142 to the catholyte chamber 134. In the catholyte chamber 134, the sodium ions 160 are joined with electrons 166 at the cathode 138 forming elemental sodium 108 as shown by Reaction 2. Because sodium 108 oxidizes in air and is highly reactive with water, the catholyte chamber 134 is filled with an at least substantially inert compound, such as, for example, mineral oil 116, to protect the sodium 108. While mineral oil 116 is used as one example of a substantially inert compound, any liquid that does not react with sodium could be used in the catholyte chamber 134. Mineral oil 116 is fed into the catholyte chamber 134 of the cell 130 through the catholyte inlet 150 as needed. As sodium 108 is denser than mineral oil 116, the sodium 108 may separate from the mineral oil 116 and occupy the bottom portion of the catholyte chamber 134 while the mineral oil 116 occupies the upper portion of the catholyte chamber 134 as illustrated by dashed line 162. The sodium 108 may exit the catholyte chamber 134 via the catholyte outlet 152. Meanwhile, in the anolyte chamber 136 the hydroxide ions 164 donate electrons 166 at the anode 140 and then decompose into oxygen 106 and water 102 as shown in Reaction 1. The oxygen gas 106 may exit through the vent 154 while excess water 102 produced in the anolyte chamber 136 may exit the cell 130 via the anolyte outlet 148.

By way of non-limiting example, the cell 130 may be operated at a temperature of about 80° C. to about 100° C. More specifically, the cell may be operated at a temperature of about 90° C. to about 100° C. A temperature range of about 80° C. to about 100° C. in the cell 130 may facilitate transportation of the sodium ions 160 across the membrane 142. In addition, the sodium 108 will be in a liquid phase at these temperatures, thus making the sodium 108 transportable without the need of an additional solvent.

Electricity for operating the electrolytic cell 130 in the hydrogen generation system 100 may be produced or obtained from numerous sources including conventional electricity sources such as coal-fired or gas-fired power plants or other combustion-based power plants. In some embodiments, electricity may be generated or obtained from clean or renewable energy sources, such as solar power, geothermal power, hydroelectric power, wind power, or nuclear power. The use of clean or renewable energy sources to produce the electricity used to generate sodium 108 in the sodium ion separator 110 reduces the overall amount of pollutants generated by the hydrogen generation system 100 compared to conventional hydrogen production processes. In still further embodiments, energy produced from the reaction in the sodium reactor 120 may be harvested and used to supply the sodium ion separator with energy.

Referring back to FIGS. 1 and 2, the sodium 108 produced from the sodium ion separator 110 may be fed to the sodium reactor 120. The sodium reactor 120 may comprise any type of reactor capable of converting sodium and water into hydrogen and sodium hydroxide. The sodium reactor 120 may be configured to receive and react sodium 108 and water 114 to produce hydrogen 112 and a second aqueous sodium hydroxide stream 113. The sodium reactor 120 may react the sodium 108 and water 114 according to the following reaction:

$$Na + H_2O \rightarrow NaOH(aq) + \tfrac{1}{2}H_2 \qquad \text{Reaction 4}$$

The sodium 108 may be fed to the reactor 120 as a liquid. For example, the sodium 108 may be fed to the sodium reactor 120 at a temperature greater than about 98° C. The water 114 may be supplied to the sodium reactor 120 as high temperature water or steam. The temperature and rate of reaction within the sodium reactor 120 may be controlled by controlling the feed rate and temperature of the water 114. For example, the water 114 may be fed in excess to the sodium reactor 120 to control the concentration of sodium hydroxide in the second aqueous sodium hydroxide stream 113.

The reaction of sodium and water is highly exothermic. As such, Reaction 4 may proceed in the sodium reactor 120 at high temperatures and/or pressures. For example, the pressure in the sodium reactor 120 may range from about 1 atmosphere to about 400 atmospheres. Additionally, the temperature in the reactor 120 may range from about 200° C. to about 900° C. Because the reaction of sodium 108 and water 114 is known to produce large quantities of heat, heat from the reactor 120 may be used to heat the sodium 108, the water 114, and the sodium ion separator 110 using known heat transfer technologies.

Because Reaction 4 is able to proceed at such high pressures, the hydrogen 112 produced from the sodium reactor 120 may be pressurized as it is formed. This may eliminate the need for a compressor to pressurize the hydrogen 112 which saves the associated capital, operating, and maintenance costs of these devices. Further, as illustrated in FIG. 2, pumps 126, 128 may be used to pressurize the sodium 108 and water 114 before the sodium 108 and water 114 enter the sodium reactor 120. By pressurizing the feeds of sodium 108 and water 114, the hydrogen 112 leaving the sodium reactor 120 may also be at a high pressure. While pumps 126, 128 are illustrated as rotary pumps in FIG. 2, any type of pump known in the art may be used for pressurizing the sodium 108 and the water 114.

In some embodiments, small quantities of mineral oil 116 (FIG. 3) may be present in the sodium 108 which is fed to the sodium reactor 120. When the mineral oil 116 is exposed to high temperatures and/or pressures in the sodium reactor 120, the mineral oil 116 may combust producing trace quantities of carbon monoxide, carbon dioxide, sodium carbonate, and additional hydrogen byproducts. The carbon monoxide, carbon dioxide, and hydrogen may exit the sodium reactor 120 with the hydrogen 112 while the sodium carbonate may exit the sodium reactor 120 with the second aqueous sodium hydroxide stream 113. Sodium carbonate in the second aqueous sodium hydroxide stream 113 may be returned to the sodium ion separator 110 via the first aqueous sodium hydroxide stream 104. In the sodium ion separator 110, it is contemplated that sodium will be transported across the membrane 142 into the catholyte chamber 134. Further, it is contemplated that carbon remaining in the anolyte chamber 136 will react with the oxygen 106 to form trace amounts of carbon monoxide and/or carbon dioxide.

Depending on the amount of mineral oil in the sodium 108 and the intended use of the hydrogen 112, the hydrogen 112 may be fed to a gas separator 124 (FIG. 2). As previously discussed, the hydrogen 112 may include impurities such as carbon monoxide and carbon dioxide from mineral oil 116 that may be present in the sodium 108. Additionally, the hydrogen 112 may contain moisture, as in the form of steam, from the sodium 108 and water 114 reaction. As such, the hydrogen 112 may pass through the gas separator 124 to form a purified hydrogen 112'. The gas separator 124 may include, for example, a membrane or a pressure swing adsorption (PSA) gas separator for producing the purified hydrogen 112'. Such membranes and PSA separators are known in the art and, therefore, are not discussed in detail herein. By way of non-limiting example, the membrane may be made from a polymeric material or a metal material, such as a palladium membrane. Such membranes are commercially available from numerous sources including, but not limited to, Praxair Surface Technology, Inc. (Danbury, Conn.), Universal Industrial Gases, Inc. (Easton, Pa.), Air Liquide (Paris, France), or Air Products and Chemicals, Inc. (Lehigh Valley, Pa.). The PSA separator may be activated alumina, a zeolite such as a molecular sieve zeolite, or an activated carbon molecular sieve. PSA separators are commercially available from numerous sources including, but not limited to, QuestAir Technologies Inc. (Burnaby, Canada), SeQual Technologies Inc. (San Diego, Calif.), Sepcor, Inc (Houston, Tex.), and Praxair Surface Technologies, Inc. (Danbury, Conn.).

The hydrogen generation system 100 of the present invention offers several advantages over other hydrogen production technologies known in the art. For example, assuming that little to no mineral oil is sent to the sodium reactor 120, the hydrogen generation system 100 is essentially environmentally benign. As illustrated in FIGS. 1 and 2, water 114 is the only material consumed in the hydrogen generating system 100 of the present invention as the sodium hydroxide streams 104, 113 may be combined and recycled through the system 100. Furthermore, the only products of the overall hydrogen generation system 100 are water 102, oxygen 106, and hydrogen 112. Additionally, the size of the hydrogen generation system 100 of the present invention and the operation parameters associated therewith, such as, for example, flow rates, will depend on the quantity of hydrogen 112 sought to be produced. As such, the size of the hydrogen generation system 100 may be easily scaled to meet demand requirements. Furthermore, in addition to hydrogen production, the sodium ion separator 110 may be used to produce elemental sodium 108, which may have additional industrial applications.

The invention has been described herein in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A method of producing hydrogen, comprising:
    feeding a first aqueous sodium hydroxide stream into an anolyte chamber of an electrolytic cell comprising the anolyte chamber, a catholyte chamber, and a membrane between the anolyte chamber and the catholyte chamber;
    feeding a substantially inert liquid compound into the catholyte chamber of the electrolytic cell;
    applying an electric potential to the electrolytic cell to form sodium cations, water, and oxygen in the anolyte chamber and to selectively transport the sodium cations from the anolyte chamber, across the membrane, and into the catholyte chamber;

combining the sodium cations with electrons in the catholyte chamber to produce liquid-phase sodium; and combining the liquid-phase sodium with water to produce hydrogen and a second aqueous sodium hydroxide stream.

2. The method of claim 1, further comprising combining the second aqueous sodium hydroxide stream with the first aqueous sodium hydroxide stream.

3. The method of claim 1, wherein feeding a substantially inert liquid compound into the catholyte chamber of the electrolytic cell comprises:

feeding mineral oil into the catholyte chamber of the electrolytic cell.

4. The method of claim 3, further comprising submerging the liquid-phase sodium below at least a portion of the mineral oil within the catholyte chamber.

5. The method of claim 1, further comprising pressurizing the liquid-phase sodium and the water before combining the liquid-phase sodium with the water.

6. The method of claim 1, further comprising separating at least a portion of the water and impurities from the hydrogen.

7. The method of claim 1, wherein combining the liquid-phase sodium with water to produce hydrogen and a second aqueous sodium hydroxide stream comprises:

feeding the liquid-phase sodium and the water into a reactor;

reacting the liquid-phase sodium and the water in the reactor; and generating the hydrogen and the second aqueous sodium hydroxide stream.

8. The method of claim 7, further comprising heating the liquid-phase sodium and the water using heat produced from an exothermal reaction in the reactor.

9. The method of claim 7, wherein feeding the liquid-phase sodium and the water into the reactor comprises feeding superheated water or steam into the reactor.

10. A method of producing hydrogen, comprising:

providing an electrochemical cell comprising an anolyte chamber, a catholyte chamber, and a ceramic membrane separating the anolyte chamber and the catholyte chamber;

feeding a first aqueous sodium hydroxide stream into the anolyte chamber;

feeding mineral oil into the catholyte chamber;

applying an electric potential to the electrochemical cell for causing sodium cations to transfer across the ceramic membrane;

forming sodium in the catholyte chamber;

feeding sodium from the catholyte chamber into a reactor;

feeding water into the reactor;

reacting the sodium and the water to produce a second aqueous sodium hydroxide stream and hydrogen; and combining the second aqueous sodium hydroxide stream with the first aqueous sodium hydroxide stream.

11. The method of claim 10, wherein feeding water into the reactor comprises feeding high pressure water into the reactor.

12. The method of claim 10, wherein applying an electric potential to the electrochemical cell comprises supplying an electric potential to the electrochemical cell from at least one of solar power, geothermal power, hydroelectric power, wind power, and nuclear power.

13. The method of claim 10, further comprising heating the electrochemical cell using heat produced from reacting the sodium and the water.

14. The method of claim 10, wherein feeding sodium from the catholyte chamber into a reactor comprises feeding liquid-phase sodium from the catholyte chamber into the reactor.

15. The method of claim 10, wherein feeding sodium from the catholyte chamber into a reactor comprises feeding a stream consisting of elemental sodium from the catholyte chamber into the reactor.

16. The method of claim 10, wherein feeding sodium from the catholyte chamber into a reactor comprises feeding a stream consisting of elemental sodium and mineral oil from the catholyte chamber into the reactor.

17. A system for producing hydrogen, comprising:

at least one electrolytic cell configured to convert aqueous sodium hydroxide into sodium and water and comprising:

an anolyte chamber containing at least a portion of the aqueous sodium hydroxide;

a catholyte chamber containing a substantially inert liquid compound; and a membrane between the anolyte chamber and the catholyte chamber;

at least one energy power source coupled to the at least one electrolytic cell and configured to supply an electrical current to the at least one electrolytic cell; and at least one reactor downstream of the at least one electrolytic cell and configured to react sodium produced by the at least one electrolytic cell with water to produce hydrogen gas and aqueous sodium hydroxide.

\* \* \* \* \*